United States Patent
Logue

[11] 3,833,255
[45] Sept. 3, 1974

[54] COMBINED LOAD COVER AND WINDSHIELD PROTECTOR FOR DUMP TRUCK

[76] Inventor: George E. Logue, 321 Winters Ln., Montoursville, Pa. 17754

[22] Filed: Oct. 29, 1973

[21] Appl. No.: 410,522

[52] U.S. Cl. .............................................. 296/137 B
[51] Int. Cl. ............................................... B60p 7/02
[58] Field of Search .... 280/100, 101, 137 B, 137 C, 280/137 D, 137 R; 160/188; 114/201 R

[56] References Cited
UNITED STATES PATENTS

| | | | |
|---|---|---|---|
| 3,489,456 | 1/1970 | Klanke | 296/100 |
| 3,768,858 | 11/1973 | Boismier | 296/137 B |

FOREIGN PATENTS OR APPLICATIONS

| | | | |
|---|---|---|---|
| 934,250 | 1/1948 | France | 114/201 R |
| 1,040,958 | 5/1953 | France | 114/201 R |
| 1,569,516 | 4/1969 | France | 114/201 R |

Primary Examiner—Robert B. Reeves
Assistant Examiner—Charles A. Marmor

[57] ABSTRACT

Two hinged cover plates are attached to a dump truck to provide a load cover. Power means is provided to lift the plates for loading, thus moving the plates through an upright semi-folded position, and then to a forward, full-folded horizontal position over the cab so as to cover the windshield and protect the same from rocks and other debris that might fall during loading. A spring is provided to give the plates spreading action in the intermediate vertical position and counterbalancing action in the cover position. The forward end of the first plate is pivotally mounted at the front of the body and the free end of the second plate is guided on the upper rail of the dump box during covering and uncovering. The power cylinder includes means for shifting the base to allow over-center action in both directions of movement of the covers. Tortuous path water seals are provided at the front of the box and at the middle hinge.

8 Claims, 9 Drawing Figures

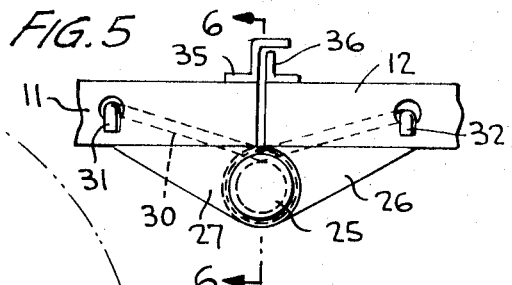
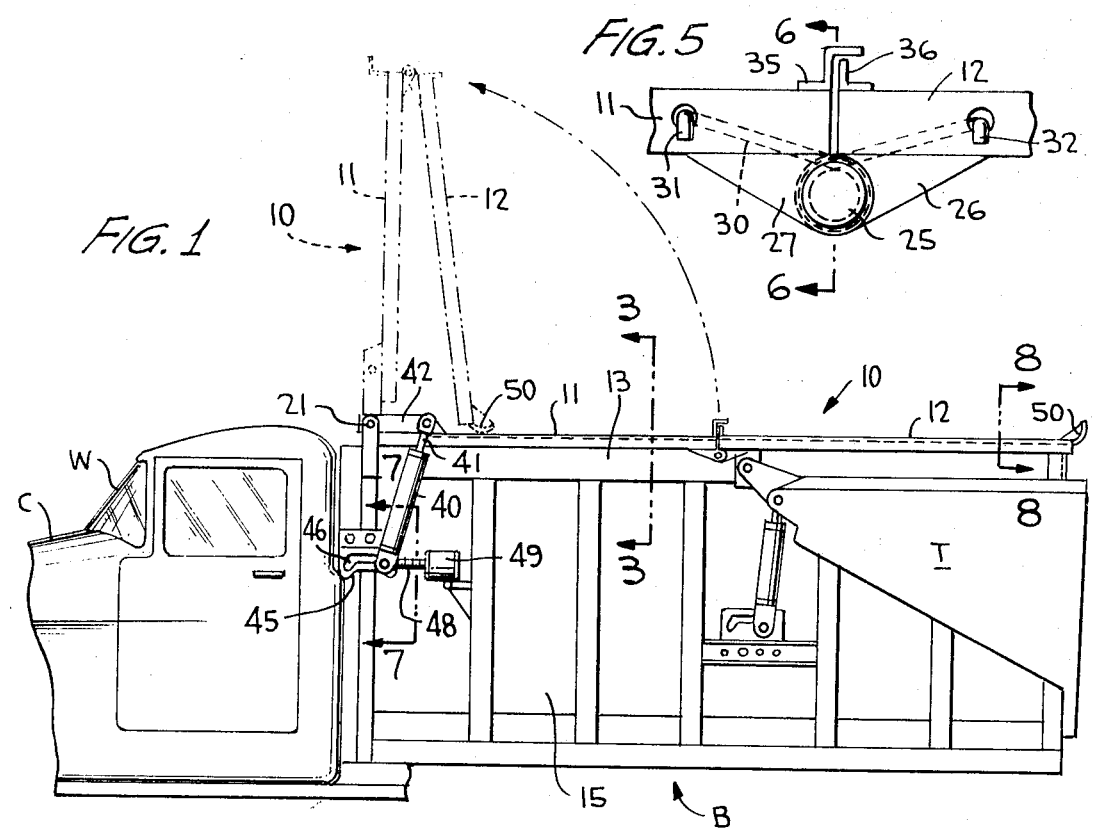
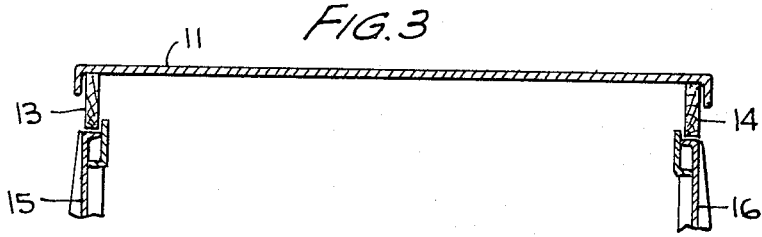
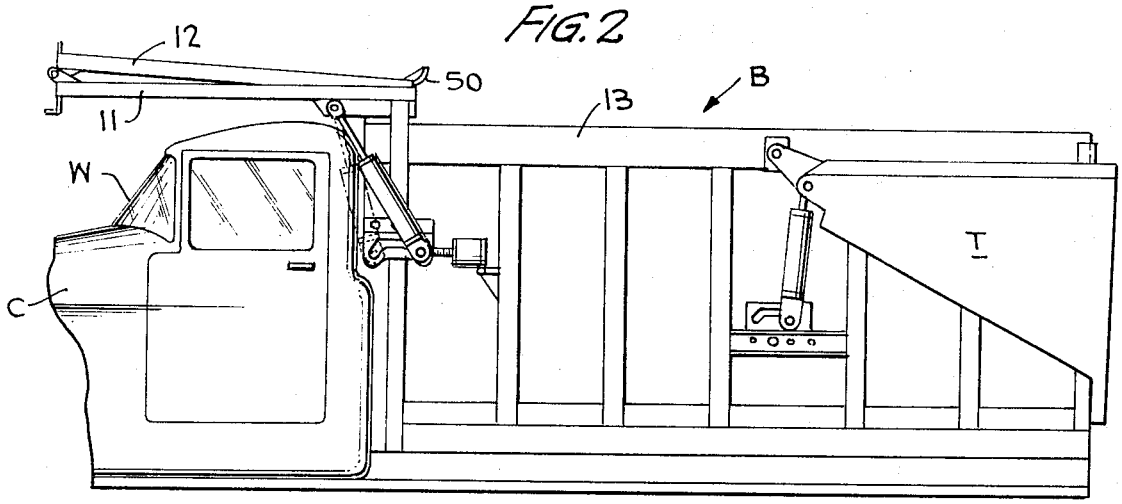

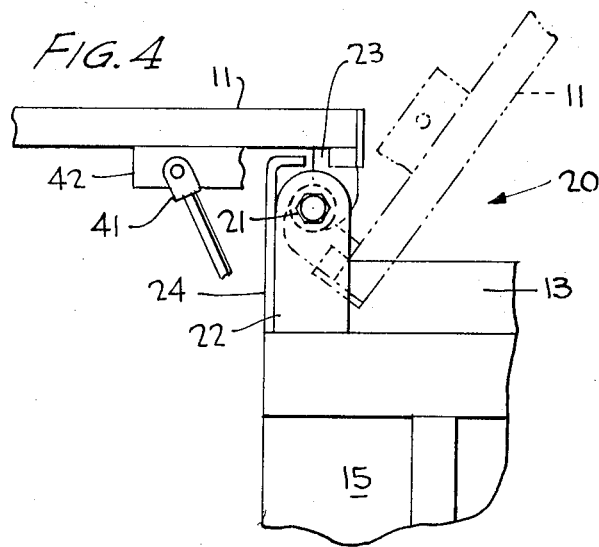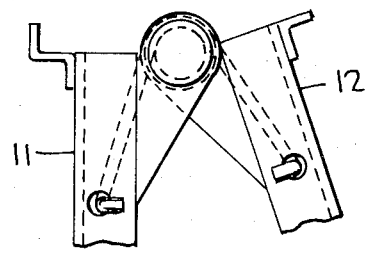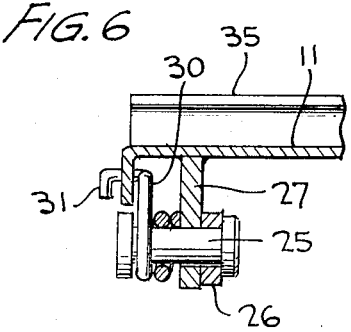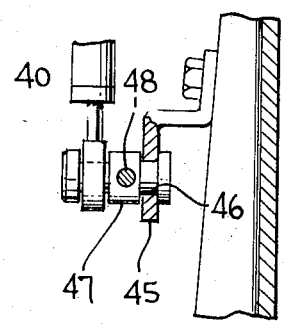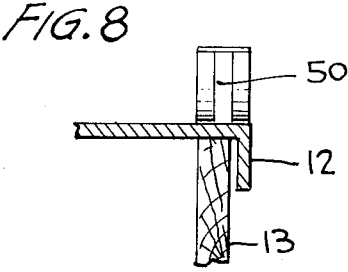

COMBINED LOAD COVER AND WINDSHIELD PROTECTOR FOR DUMP TRUCK

FIELD OF THE INVENTION

The present invention relates to truck bodies, and more particularly, to an improved load cover and windshield protector for the body.

BACKGROUND OF THE INVENTION

The importance of a cover for the load of a dump truck is being brought more and more to the attention of highway officials and the public. As the numbers of dump trucks increase on the nation's highways, the incidents of broken windshields and accidents resulting from falling rock and debris from a travelling dump truck is increasing beyond the tolerable level. In one state alone, a study has found that approximately 50,000 windshields are broken annually at a cost to the public of over $5 million. At least 29 states have already enacted "spillage legislation," but experience has shown this to be inadequate due to the requirement in most that an enforcement officer must see the incident. A giant step in the right direction was made in the Clean Air Act of 1971 that requires covering at all times when in motion "open-bodied trucks transporting materials likely to give rise to airborne dust." Several State Legislators, as well as the U.S. Congressmen are now looking toward more comprehensive laws that would require any load on the highway to be covered during movement of the truck.

There have been several attempts in previous years to provide a dump truck cover that would be effective and yet economical to manufacture and easy for the truck driver to operate. To my knowledge, none of the previous attempts have been what could be classified as "reasonably successful" for one or more reasons. One type of such prior art device is shown in the Roberts et al. U.S. Pat. No. 3,168,345. This includes a fabric canvas body for the cover and a frame to support the cover and to retract the cover to a folded up position adjacent the front of the dump box. This cover, like all fabric covers, is susceptible to considerable wind forces as the truck is travelling along the highway, and thus the cover lasts a relatively short time until the canvas needs to be replaced. Further, this type of cover, especially after becoming worn, is also not effective to guard against large boulders or rocks that can jolt out of a truck and through a windshield, even causing death to the occupant of the vehicle.

An apparent improvement on the canvas cover for the related purpose of retaining heat in a dump body for hauling asphalt is shown by the Comisac patent No. 3,472,548, issued Oct. 14, 1969. In this arrangement, the cover is made of a plurality of metal slats that are hingedly connected together, not unlike an antique roll top desk. This type of cover may have proven to be more durable in service and more effective in holding larger types of material, but it is believed to be lacking in reliability and smoothness of operation due to the inherent problem of binding of the slats during movement, which is compounded by the tendency of gravel, asphalt or the like to become clogged in the track in which the cover slides.

Furthermore, in both of the previous types of dump box covers mentioned, as well as in all others known to me, there has not been a design wherein the cover doubles as a protector for the windshield of the truck when the cover is open and thus the truck is in the loading mode of operation. There is a high incidence of falling rock and other debris that can come into contact with the truck windshield when the truck is being loaded, particularly from large cranes and loaders, and thus I have found that such a function would be highly desirable in an advanced cover design.

OBJECTIVES OF THE INVENTION

Accordingly, it is one object of the present invention to provide a combined load cover and cab windshield protector for a dump truck.

It is another and more specific objective to provide such a dump box cover that is simple in design, rugged in use, effective to retain all types of material and more reliable in operation.

It is still another object of the present invention to provide a combined load cover and windshield protector utilizing first and second plates that are extended by a simple pivoting action to lie in a single plane to cover the load and that fold over on themselves to form the windshield cover.

It is still another object of the present invention to provide a combined load cover and windshield protector having features that allow maximum ease of operation for the operator.

BRIEF DESCRIPTION OF THE INVENTION

There is provided by the present invention a combination truck dump box cover and cab windshield protector. The basic structure comprises first and second cover plates, hinge means for connecting the plates at adjacent edges and a pivot means for mounting the first plate along the forward edge of the dump box. The plates are adapted to normally extend over the box when positioned substantially horizontally and lying in a single plane in order to completely cover the load in the box. In the fully open position, the plates are adapted to fold over in face-to-face contact extending forwardly from the front of the dump box and substantially over the windshield of the truck cab to protect the same.

A power means in the form of hydraulic cylinders are mounted on the dump box and the piston rods are connected to the first cover plate adjacent the mounting pivot. As the cylinders are actuated, the plates are raised through an upright vertical position and forward to the protecting position over the cab. The base of the cylinder is mounted for movement fore and aft in order to allow over-center action of the working end of the piston rod in both the opening and closing modes of operation.

Spring means is provided at the hinge means between the two plates to slightly spread the plates when the covering operation is being performed. The tension in the spring is insufficient to spread the plates when they are positioned in juxtaposition to each other over the cab. However, the spring means is arranged so that a force tending to counter-balance the weight of the plates by forcing the free end of the second plate against the rim of the box is provided. The power cylinders are used to lock the cover in position over the load. Curved guide shoes are provided to assist the movement of the free edge of the plate along the rim of the box during the covering operation.

Shield means to protect the load against weather are provided by two tortuous path seal arrangements. The seal adjacent the leading edge of the first plate includes an L-shaped plate with the mounting for the first plate being an angle member or bracket to extend around the rearwardly extending leg of the shield. Cooperating Z and angle members form the seal at the point of the intermediate hinge between the plates.

Another important feature of the cover of the present invention is concerned with the front edge of the second plate serving as a plow to smooth the top of the load being carried. Since the plate is at an angle to the load, there is no possibility of lifting a top layer of the load to rest on the top of the cover, as in previous designs.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWING

FIG. 1 is an overall side view of the combined load cover and dump box and a portion of the cab of the truck on which the box is mounted;

FIG. 2 is a showing of the dump box cover positioned in the windshield cab protecting position;

FIG. 3 is a cross-sectional view taken along lines 3—3 showing the mating of the cover plate with the side boards of the dump box;

FIG. 4 is an enlarged side view of the front edge of the dump box showing the pivotal mounting of the first plate member thereon and the seal arrangement;

FIG. 5 is a detailed side view of the hinge and spring between the two plate members;

FIG. 5A is a showing of the hinge in an intermediate operational position;

FIG. 6 is a cross-sectional view taken along lines 6—6 of FIG. 5 and showing the structure and attachment of the spring;

FIG. 7 is a cross-sectional view showing the movable mounting means for the base of the operating cylinder; and FIG. 8 is a detailed cross-sectional view showing the rear face of the guide shoe for the second plate.

DETAILED DESCRIPTION OF THE PREFERRED EMBODIMENT

In FIG. 1, there is shown a full side view of a combined load cover and cab protector, generally represented by the reference numeral 10, mounted on a dump box B. The cover assembly 10 comprises a first plate 11 and a second plate 12 with bent over lateral edges for sealed protection of the load and for guiding purposes. As best shown in FIG. 3, the plates 11, 12 are adapted to rest on conventional wooden side boards 13, 14 mounted on the top edge of the sides 15, 16 of the box B.

The dump box B may include a tailgate T constructed in accordance with the teachings of my previous application, Ser. No. 272,025, filed July 14, 1972, entitled "Tailgate For Dump Truck." The tailgate T is provided with hydraulic cylinders 17 adapted to raise and lower the same, as set forth in the previous application.

The combined load cover and cab protector 10 of the present invention is particularly adapted to be used with this new type of tailgate, since as will be evident, the load cover is moved in the open position entirely out of the way in front of the front edge of the dump box B so that the tailgate T can move to its forwardmost open position. However, it should be understood that the invention is not limited to use with any particular type of dump body or with this type of tailgate, but can be used with other more conventional tailgate structures.

At the forward end of the first plate 11, there is provided hinge means, generally designated by the reference numeral 20 (see FIG. 4). The hinge means comprises a pin 21 extending through an upstanding mounting member 22. The plate 11 has an offset or L-shaped bracket 23 through which the pin 21 also passes. It is to be understood that on the opposite side of the dump box B there is provided an identical pivot mounting arrangement (not shown). Extending across the full width of the front of the box and supported by the upstanding members 22 is an L-shaped shield 24. It will be realized that when the plate 11 is in the horizontal load covering position (see FIG. 1) that the top of the shield 24 forms a tortuous path shield to protect the load from the water at this point. Upstanding rail 46a (FIG. 4) extends across the front edge of the plate 11 to extend up under the overhang of shield 24 (see dotted line position).

At an intermediate point along the cover assembly 10 is provided the hinge means for pivotally connecting the plates, and in the embodiment illustrated herein, this takes the form of a hinge pin 25 (one on each side) passing through gusset plates 26, 27 attached to the underneath side of the plates 11, 12. As can be readily visualized from viewing FIG. 1, when the forward plate 11 is lifted, the hinge 25 allows the assembly 10 to fold in the middle and assume an upright position shown in the dashed line outline. This simple folding action provides for reliability in service of the cover. Since the assembly is lifted substantially straight up from the load it is not susceptible to being jammed or clogged with foreign matter carried in the box B.

Also according to the invention, a torsional spring 30 is mounted on each hinge pin 25 with the opposite ends 31, 32 extending through apertures in the flanges of the plates 11, 12, respectively. This spring provides the important function of slightly spreading the plates 11, 12 when the vertical position is reached, as shown by the dashed line outline in FIG. 1. The position where the spring is spreading the plates is also best shown in FIG. 5A of the drawings. It will be realized in this case that the spring is slightly compressed by the closing action of the plates 11, 12. As the plate assembly 10 moves on down to the forward cab protecting position (see FIG. 2) the spring is not compressed in any substantial additional amount. Thus, when the plates finally rest forward, gravity on the upper plate is sufficient to bring the plates into juxtaposition and holds them there, as shown in the FIG. 2 illustration.

Also of significance, is the operation of the spring 30 when the plate assembly 10 is covering the load. The spring under this circumstance is as shown in FIG. 5. It will be realized that the coil now has a tendency to be unwound so that tension results and the ends 31, 32 are tending to counter the downward force on the plates. The tension is selected, however, to permit the gravitational force on the members to substantially override the spring force and thereby keep the cover assembly 10 in snug engagement with the rails 13, 14.

Attached to the upper edge of the plate 11 adjacent the hinge joint is a Z-shaped plate 35. On the opposite edge of the plate 12 is an angle member 36 and together these pieces form a tortuous path seal to protect the load underneath from water. It will be realized that the cover assembly 10, thus fully protects the load by simple and trouble-free means that does not interfere with the folding action.

The power means for moving the cover assembly 10 from the load cover position of FIG. 1 to the cab protector position of FIG. 2 comprises a hydraulic cylinder 40 (one on each side) having a piston rod 41 attached pivotally at its free end to a reinforcement bracket 42 on the top of the plate 11. The base of the cylinder 40 is carried in a slotted mounting bracket 45 attached to the forwardmost side buttress, as shown in FIG. 7. The slot 46 is provided with lobes at each end thereof in order to receive and hold the laterally extending pin element 47, shown also in FIG. 7. A driving screw 48 engages the pin element 47 and is turned by a motor 49 (see FIG. 1). This provides a suitable means for shifting the mounting pin 47 along the side of the truck so as to allow over-center action of the cylinder 40 in both directions. Thus, when the base of the cylinder 40 is located in the forward lobe (see full line position of cylinder, FIG. 1), it will be apparent that the cover assembly 10 can be raised to the vertical position (shown in dashed line outline of FIG. 1) and then continue to a point just slightly over the center of gravity allowing the assembly 10 to move toward the full line position of FIG. 2. The cylinder 40 is double acting so that at the over-center point, the piston rod 41 is merely controllably pulled back in the cylinder and the plates 11, 12 come to rest over the cab C in a manner very adequately covering the same and protecting the same from above. The fluid is locked in the cylinder on both sides of the piston by closing both valves so that the cover assembly 10 is thus secured.

When it is desired to move the cover assembly 10 back to the load cover position, the base of the cylinder 40 is shifted to the left to the dotted line position of FIG. 2, whereupon the cylinder 40 can then move the assembly 10. The center of gravity shifts over the pivot pin 21 before the limit of power movement is reached so that the cover position can be reached. It will be remembered as the upright (half-way) position is reached, the plates 11, 12 are spread apart by the compressive force in the spring 30, thus urging the rear plate 12 in a manner that upon retracting the piston rod 41, the plates 11, 12 move smoothly back into the cover position where they occupy substantially a single horizontal plane, as shown by the full lines in FIG. 1. In order to assist in this sliding action of the rear edge of the plate 12, a pair of sliding shoes 50 with gusset reinforcement (see FIG. 8) are adapted to engage the top rim of the side boards 13, 14.

If the material, such as stone aggregate or asphalt happens to be piled in a mound in the center of the body, the leading edge of the plate 12 serves to plow the material toward the rear smoothing out the load and allowing the cover assembly 10 to come all the way down. Since the plate 12 is still extending upwardly at a substantial angle as the edge passes the middle of the body B, the material is not picked up on the plate 12, but is effectively shifted to the sides and the rear next to the tailgate T.

The cylinder 40 can be pressurized in order to pull the cover assembly 10 down into snug engagement with the side rails 13, 14, if desired. As previously mentioned, when the cover assembly 10 is in the final horizontal cover position, the piston in the cylinder 40 is locked into position by trapping pressurized hydraulic fluid on both sides thereby providing a positive hold-down. This will assist the gravitational force in preventing the assembly 10 from a tendency to bounce when traversing unusually rough terrain. This also can be particularly important when hauling large boulders or tree stumps, since the plates 11, 12 may not be able to assume the full down position. In any instance, the steel plates 11, 12 positively hold down the load and are not susceptible to wear or tearing, thus giving the maximum safety factor to the structure.

It should be understood that several modifications and changes can be made in certain parts of the inventive structure shown without departing from the claimed invention covered in the following claims. For example, it is contemplated that any other suitable means for providing the over-center action of the cylinder 40 could be used in lieu of that shown. Also, other distinctive types of power means can be used, such as a rotary motor and drive operable to turn the plate 11 about the pivot pins 21. Also, other distinctive apparatuses may be utilized in order to provide the desired spreading action of the plates 11, 12 that is accomplished by the spring 30 in the embodiment shown herein. With any such changes, the basic concept of first and second cover plates to cover the load in a weather-tight manner, and to do double duty as a windshield cover when opened, are not disturbed. Thus, it is to be understood that the invention is capable of use in various other combinations and environment and is capable of changes or modifications within the scope of the inventive concept as expressed herein.

What is claimed is:

1. A combined load cover for truck dump box and cab windshield protector comprising first and second cover plates, hinge means for pivotally connecting said plates, said plates normally extending over said box when positioned substantially horizontally and lying in a single plane, pivot means for mounting said first plate along an edge opposite said hinge means adjacent the front of said box and power means on said box and connected to one of said plates for pivotally lifting and folding said plates for opening the top of said box and moving said plates through an upright vertical position to a forward horizontal position over the cab so as to cover the windshield.

2. The combination load cover and cab windshield protector of claim 1 wherein is further provided spring means associated with said hinge means to slightly spread said plates when positioned vertically to allow opening action along the top of said box during the covering operation, the tension in said spring being insufficient to spread said plates when positioned in the horizontal cab protector position.

3. The combination load cover and cab windshield protector of claim 2 wherein said spring means is operative to provide for a force tending to counterbalance the weight of said plates by forcing the free end of said second plate against the rim of said box.

4. The combination load cover and cab windshield protector of claim 3 wherein said free end includes a curved guide shoe along each side of said box to engage said rim.

5. The combination load cover and cab windshield protector of claim 1 wherein said power means includes a fluid cylinder, means for shifting the base of said cylinder for shifting the over-center location to allow movement of said plates by said cylinder in both directions.

6. The combination load cover and cab windshield protector of claim 1 wherein said pivot means comprises a pin on each side of said box, upstanding mounting means on said box for said pins, shield means extending across the front of said box and up above said mounting means and rearwardly to form a tortuous path seal, and angle bracket means on said first plate for receiving said pin to position the leading edge below said plate in the covering position and to extend around said shield means in the windshield protecting position.

7. The combination load cover and cab windshield protector of claim 6 wherein is provided a Z member on the first plate at the edge adjacent said hinge means and cooperating angle member on the corresponding edge of said second member, the top of said Z member overlying the upstanding leg of said angle member to provide a tortuous path seal.

8. The combination load cover and cab windshield protector of claim 1 wherein the rear edge of said second plate moves along the top of said load during the covering operation to smooth the same by edge plowing action.

* * * * *